United States Patent
Kapsenberg

(10) Patent No.: US 9,799,130 B1
(45) Date of Patent: Oct. 24, 2017

(54) LOSSLESS SPATIAL FEATURE DESCRIPTOR COMPRESSION

(71) Applicant: Google Inc., Mountain View, CA (US)

(72) Inventor: Pieter Kapsenberg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/924,376

(22) Filed: Oct. 27, 2015

(51) Int. Cl.
*G06K 9/00* (2006.01)
*G06T 11/20* (2006.01)

(52) U.S. Cl.
CPC .................. *G06T 11/206* (2013.01)

(58) Field of Classification Search
CPC ..................................... G06T 11/206
See application file for complete search history.

(56) References Cited

U.S. PATENT DOCUMENTS

| | | | |
|---|---|---|---|
| 8,576,098 B2 | 11/2013 | Chang et al. | |
| 8,666,169 B2 * | 3/2014 | Tang | G06K 9/4647 382/190 |
| 2013/0223683 A1 * | 8/2013 | Jiang | G06K 9/4638 382/103 |
| 2014/0033297 A1 * | 1/2014 | Beals | G06F 21/51 726/16 |

OTHER PUBLICATIONS

Panti, Berner Kike. "Low bit rate representation of visual binary descriptors." (2014).*
Ascenso, João, and Fernando Pereira. "Lossless compression of binary image descriptors for visual sensor networks." Digital Signal Processing (DSP), 2013 18th International Conference on. IEEE, 2013.*
Ding, Jian-Jiun, et al. "Compression for the feature points with binary descriptors." Digital Signal Processing (DSP), 2014 19th International Conference on. IEEE, 2014.*
McGuiness et al., "Efficient Storage and Decoding of SURF Feature Points", MMM'12 Proceedings of the 18th International Conference on Advances in Multimedia Modeling, Jan. 4, 2012, 12 pages.
Takacs et al., "Outdoors Augmented Reality on Mobile Phone using Loxel-Based Visual Feature Organization", MIR'08, Vancouver, British Columbia, Canada, Oct. 30, 2008, 8 pages.

(Continued)

*Primary Examiner* — Jonathan S Lee

(57) ABSTRACT

A computer-implemented method includes receiving a spatial feature descriptor representing a binary string of comparison results between specified pairings of N patches in a region of an image, N being an integer greater than one. The method further includes compressing the spatial feature descriptor by determining a minimum number of bits needed to represent N, and generating a sorted array representing a ranking of the N patches based on the binary string of comparison results. Each element of the sorted array is associated with a corresponding patch of the N patches and stores a value representing a ranking of the patch relative to the other N−1 patches and coded using the minimum number of bits needed to represent N. The sorted array may be further compressed using a progressive bit representation decimation process.

20 Claims, 7 Drawing Sheets

(56) References Cited

OTHER PUBLICATIONS

Ascenso et al., "Lossless Compression of Binary Image Descriptors for Visual Sensor Networks", Proc International Conf. on Digital Signal Processing, Santorini, Greece, Jul. 1, 2013, 8 pages.
Chandrasekhar et al., "Transform Coding of Image Feature Descriptors", Proceedings of SPIE—The International Society for Optical Engineering (Impact Factor: 1.2), Jan. 1, 2009, 9 pages.
Chandrasekhar et al., "CHoG: Compressed Histogram of Gradients, A Low Bit-Rate Feature Descriptor", IEEE Computer Society, Miami, FL, Jun. 20, 2009, 8 pages.
Alahi et al., "FREAK: Fast Retina Keypoint", 2012 IEEE Conference on Computer Vision and Pattern Recognition, Jun. 16, 2012, 8 pages.

* cited by examiner ial feature descriptors. For ease of illustration, the techniques of the present disclosure for compressing and decompressing a spatial feature descriptor are illustrated in the example context of a Fast Retinal Keypoint (FREAK) spatial feature descriptor. However, these techniques are not limited to this particular implementation, but instead may be applied, using the guidelines provided herein, to the compression and decompression of similarly-structured spatial feature descriptors that rely on binary comparisons between various patches, or regions, of an image. Accordingly, reference herein to a FREAK spatial feature descriptor also may apply to other such spatial feature descriptors unless otherwise noted.

LOSSLESS SPATIAL FEATURE DESCRIPTOR COMPRESSION

BACKGROUND

Field of the Disclosure

The present disclosure relates generally to spatial feature analysis for imaging and, more particularly, to the processing and storage of spatial feature descriptors.

Description of the Related Art

Many computer vision applications process imagery to identify a relatively sparse number of keypoints, which represent spatial features of interest in the corresponding imagery. These keypoints are represented using data structures referred to as spatial feature descriptors. One class of spatial feature descriptors utilizes binary, or relative comparisons, of the intensities of different regions, or "patches," of an area of an image region, with the results of the comparisons coded as a binary string that serves as a spatial feature descriptor for the image region. For example, application of the Fast Retina Keypoint (FREAK) algorithm typically results in a 512 bit binary string descriptor for each keypoint in an image. However, with potentially thousands of keypoints in each image, and with video having tens or even hundreds of such images for every second of playback, the transmission and storage requirements for the spatial features extracted from a video segment of even a modest duration can become daunting. The difficulties in transmitting and storing spatial feature descriptors becomes even more severe for the implementation of keypoint-extraction processes in a larger-scale system, such as a server-based system or distributed system, with numerous users sending, receiving, and storing such spatial feature descriptors,

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate example systems and techniques for lossless compression and decompression of patch-compari-son-based spatial feature descriptors. For ease of illustration, the techniques of the present disclosure for compressing and decompressing a spatial feature descriptor are illustrated in the example context of a Fast Retinal Keypoint (FREAK) spatial feature descriptor. However, these techniques are not limited to this particular implementation, but instead may be applied, using the guidelines provided herein, to the compression and decompression of similarly-structured spatial feature descriptors that rely on binary comparisons between various patches, or regions, of an image. Accordingly, reference herein to a FREAK spatial feature descriptor also may apply to other such spatial feature descriptors unless otherwise noted.

Figure 1:
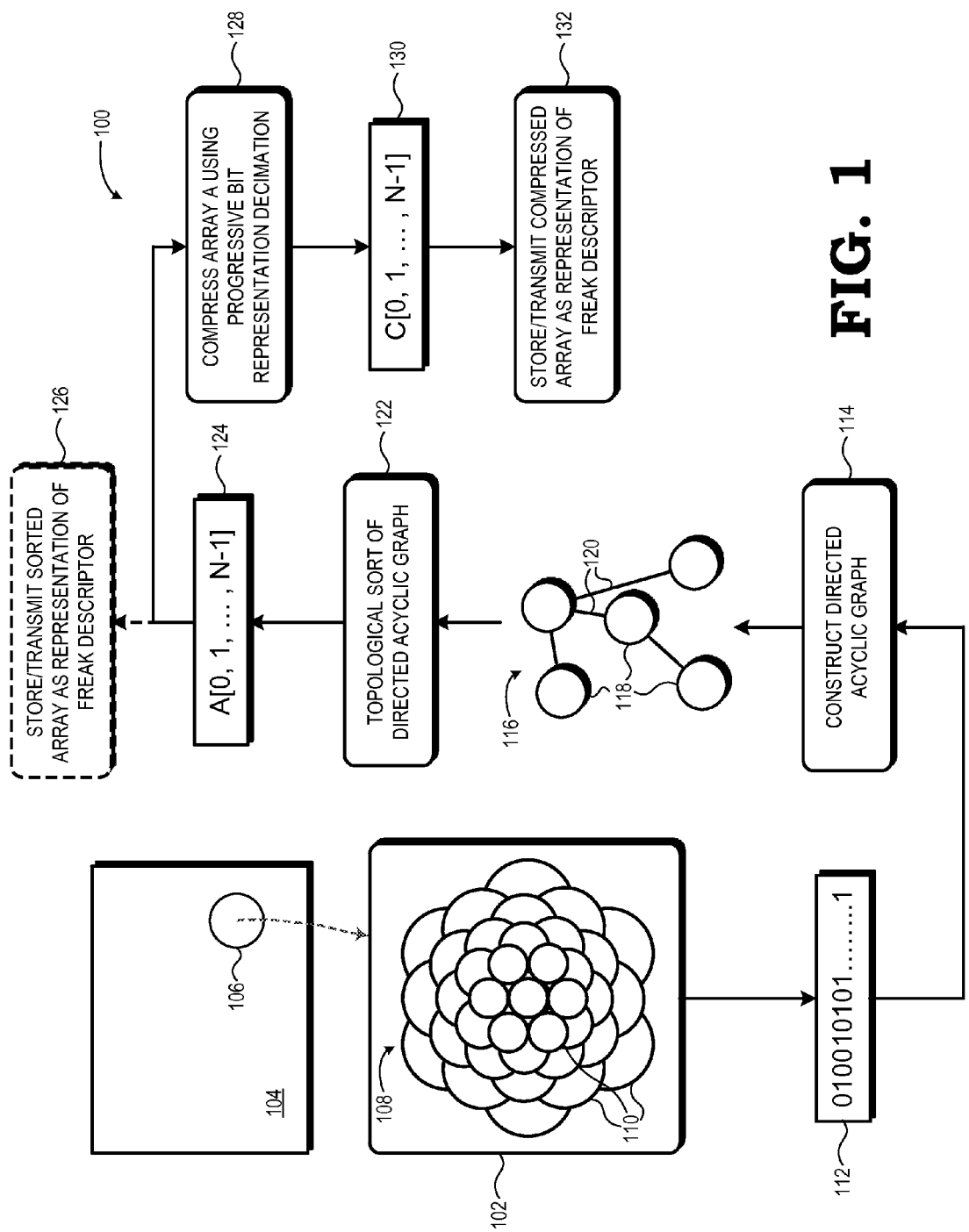
FIG. 1 is a diagram illustrating a lossless spatial feature compression process in accordance with some embodiments.

FIG. 1 illustrates an example lossless FREAK spatial feature descriptor compression process 100 in accordance with at least one embodiment of the present disclosure. The FREAK spatial feature descriptor compression process 100 (hereinafter, "descriptor compression process 100") is implemented by a compression engine that may be implemented as a set of one or more processors executing a program represented by a set of executable instructions that, when executed, manipulate the set of one or more processors to perform the tasks described herein. Alternatively, the descriptor compression process 100 may be implemented using hard-coded logic, in the form of, for example, an application specific integrated circuit (ASIC), a programmable logic device, or a combination thereof. The process 100 also may be implemented as a combination of hard-coded logic and one or more processors executing software. An example hardware configuration of an electronic device configured to implement the compression engine (which in turn implements the descriptor compression process 100) is described in greater detail subsequently with reference to FIG. 7.

Initially, a FREAK spatial feature analysis algorithm 102 (hereinafter, "FREAK algorithm 102") is applied to an image 104 to extract one or more FREAK spatial feature descriptors describing corresponding keypoints present within the visual content of the image 104. As in known in the art, for an identified keypoint in a region 106 of the image 104, the FREAK spatial feature analysis algorithm 102 defines a set 108 of concentric rings of patches 110 covering the region 106, with this set 108 of concentric rings typically configured as a set of seven (7) rings of six (6) patches 110 each, along with a center patch 110, for a total of forty-three (43) patches in the set 108. Each patch 110 is considered to have a single value (hereinafter, "the patch value") that is equal to the average value of the pixels it covers. Although illustrated as having a circular shape, in practice the patches typically are represented as the bounding box containing the circular patch, and the patch value is calculated using an integral image for this bounding box.

The FREAK algorithm 102 then compares specified pairs of the patches 110 using a hard-coded or otherwise predefined lookup table (not shown) that specifies which pairings of patches 110 are to be compared. The result of each comparison between a specified pair of patches 110 is then represented as a bit value in a corresponding bit position of a FREAK spatial feature descriptor 112 generated for the keypoint. That is, for a specified pair of patches 110 denoted (A,B), if the patch value of patch A greater than or equal to the patch value of patch B (that is, A>=B), then the corresponding bit in the FREAK spatial feature descriptor 112 is set to "1", otherwise it is set to "0". For the 43-patch implementation noted above, the FREAK spatial feature analysis algorithm 102 typically defines a set of 512 patch comparisons, and thus the result of the FREAK algorithm 102 is a FREAK spatial feature descriptor 112 having a 512-bit bit string describing the results of the patch value comparisons for the corresponding specified 512 patch pairings.

Accordingly, assuming an image, such as image 104, of video has on average two thousand of such keypoints, each image of the video would require 128 kilobytes (512 bits/indicator*2000 indicators/image*8 bits/byte). Assuming a frame rate of 120 frames/second (fps), every second of video being analyzed could require 15.36 megabytes (128 kilobytes/frame*120 frames/second) to represent the keypoints contained therein as FREAK spatial feature descriptors. This data volume often may be impracticable from a storage or transmission perspective, particularly in the context of a server transmitting, receiving, and storing such image metadata for numerous client devices.

Thus, to reduce the transmission and storage requirements for the FREAK spatial feature descriptor 112, the FREAK spatial feature descriptor compression process 100 leverages the binary comparison process of the FREAK spatial feature analysis algorithm 102 and other such binary comparison spatial feature algorithms to generate a compressed representation of the FREAK spatial feature descriptor 112 in a lossless manner. In particular, a compression algorithm described herein is predicated on the observation that because the FREAK spatial feature descriptor 112 is built using binary patch comparisons only, the absolute value of the patch value of each patch is not relevant; rather, it is only the relative value compared to a subset of the other patch values. This means that a set of patches with values 0 . . . N−1 (where N=the number of patches 110 in the set 108, so N=43 for the 43-patch set 108 typical to the FREAK algorithm) sorted in the same ways as a given set of patches with arbitrary values would yield an identical descriptor. Thus, a descriptor may be uniquely identified by the array A[0 . . . N] shuffled in some particular order. For the 43-patch example, there are 43! such orderings, and thus would take 176 bits ($\lceil \log_2(43!) \rceil$) to uniquely identify this order. As such, for a 512-bit FREAK spatial feature descriptor based on N=43 patches, the best possible lossless compression would achieve a compressed representation of 176 bits.

However, while this represents the best-case scenario, in reality the representation of the FREAK spatial feature descriptor in this manner would involve multiplication and division operations using factorial numbers, which are complex and cycle-intensive processes to implement in a typical arithmetic logical unit (ALU). Thus it may be impracticable to implement an algorithm providing best-case compression depending on computing resource and time constraints. Accordingly, in some embodiments, the FREAK spatial feature descriptor compression process 100 employs an approach that provides a compression factor that, while not equal to the best-case scenario, provides a high degree of compression while avoiding the use of factorial-based multiplication and division operations and other highly-complex computation processes. This approach starts with the observation that each array entry in the sorted array A[ ] described above has a value no larger than 42 (or N−1 more generally), and thus requires six (6) bits (or b=$\lceil \log_2 (N) \rceil$ bits more generally) to store each array entry. So for 43 entries, the total storage space for the array is 258 bits (43 entries*6 bits/entry). Thus, in one embodiment the FREAK spatial feature compression process 100 may construct a sorted array A[0 . . . 42] with each entry representing a corresponding patch 110 and having a six-bit value representing the position, or magnitude, of the patch value of the patch relative to the other 42 patches in the set 108, and thus require only 258 bits, rather than the 512 bits required for the uncompressed original FREAK spatial feature descriptor 112. More generally, for a FREAK spatial feature descriptor 112 having set 108 of N patches, the FREAK spatial feature compression process 100 may construct a sorted array A[0 . . . N−1] with each entry representing a corresponding patch 110 and having a b-bit value representing the position, or magnitude, of the patch value of the patch relative to the other N−1 patches in the set 108, with a resulting size of b*N bits.

To construct this sorted array A, in at least one embodiment the descriptor compression process 100 employs a directed graph process 114 to constructs a directed acyclic graph (DAG) 116 from the bit string representing the FREAK spatial feature descriptor 112, which each of values 0 . . . 42 representing the nodes 118 of the DAG 116 and each of the 512 patch value comparison results in the bit string representing edges 120 between the nodes 118. Because the edges 120 originate from comparison operations between unchanging values, the resulting DAG 116 does not contain any cycles. As such, the nodes 118 in the DAG 116 can be topologically sorted, and thus the descriptor compression process 100 employs a topological sort process 122 to topologically sort the DAG 116 so as to construct a sorted array A[0 . . . N−1] (also denoted as "sorted array 124"), with each element of the sorted array A representing a corresponding patch of the N-patch set 108 and the value of the element representing the relative patch value of the patch compared to the other N−1 patches. Moreover, each element value is stored or coded with only the minimum number of bits necessary to code values between 0 and N−1. Thus, for a 43-patch set 108, the resulting sorted array A[0 . . . 42] has a size of 258 bits (43 elements*6 bits/element), compared to the 512 bits of the original FREAK spatial feature descriptor 112, as noted above. Because the particular set of patch comparisons in the FREAK algorithm 102 does not uniquely identify a particular ordering, there is more than one possible topological sort. However, any of the possible topological sorts will yield the same descriptor, and thus any resulting topological sort is sufficient for the purposes of the topological sort process 122.

At the conclusion of the topological sort process 122, a compressed representation of the FREAK spatial feature descriptor 112 has been constructed in the form of the sorted array 124 (i.e., sorted array A[0 . . . N−1]). For the typical 43-patch FREAK spatial feature descriptor, this results in a data size from 512 bits to 258 bits, or a 1.98 compression ratio. As such, as represented by block 126, the sorted array 124 may be stored, transmitted, received, or otherwise utilized as a compressed representation of the FREAK spatial feature descriptor 112.

However, in some embodiments, the descriptor compression process 100 may achieve further reduction in the size of the data needed to represent the FREAK spatial feature descriptor 112 based on an observation that due to the topological sort process 122, each element value occurs only once in the sorted array A[0 . . . N−1]. As such, as each array element is added to the sorted array, the possible number of element values selectable for the next array element is reduced, until finally when adding the last array element there is only one element value of the 0−N−1 original element values to select for the last array element. As such, as the construction of the array progresses, the number of bits needed to represent the number of possible remaining element values is reduced. To illustrate, for the 43-patch example, after 11 of the 43 values have been added (each with 6 bits), 32 values (0-31) remain. As values between 0 and 31 require only five (5) bits to represent them, the next 16 elements could be represented as five-bit values, at which point only sixteen (16) possible values remain (0-15), and thus requiring only four bits to code, and so on. To this end, the descriptor compression process 100 employs a progressive bit representation decimation process 128 (FIG. 2) to generate a compressed array C[0 . . . N−1] (also denoted compressed array 130) from the sorted array A[0 . . . N−1] using a progressive reduction in the bits used to code each successive array element value. As represented by block 132, this compressed array 130 then may be stored, transmitted, received, or otherwise utilized as a more fully compressed representation of the FREAK spatial feature descriptor 112.

Figure 2:
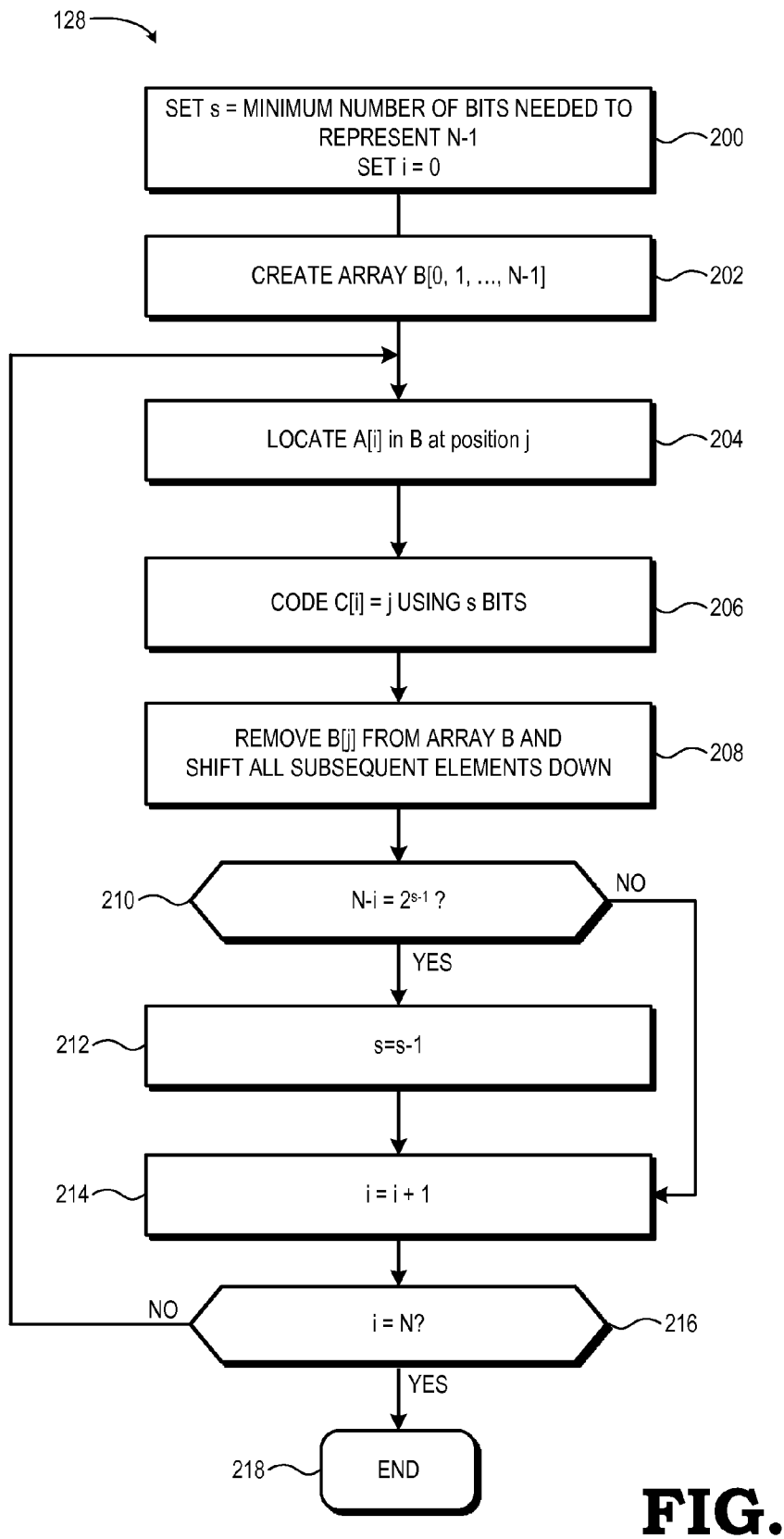
FIG. 2 is a flow diagram illustrating a progressive bit representation decimation process employed in the lossless spatial feature compression process of FIG. 1 in accordance with some embodiments.

FIG. 2 illustrates an example implementation of the progressive bit representation decimation process 128 used to generate the compressed array C[0 . . . N−1] from the sorted array A[0 . . . N−1]. The process 128 initializes at block 200, whereby the compression engine initially sets the variable s to the minimum number of bits needed to binary code the value N (which represents the number of patches represented in the set 108), that is, initially set $s = \lceil \log_2(N) \rceil$. Likewise, the index variable i is initialized to zero, that is, initially set i=0. This initialization further includes the compression engine generating at block 202 a temporary array B having N elements, which are populated with incrementing values from 0 to N−1, that is for x=0 to N−1, B[x]=x, or B=[0, 1, 2, . . . , N−1].

So initialized, the process 128 proceeds to a first iteration of block 204, whereupon the compression engine searches the array B for the array element at position j having an element value equal to the element value at position i of the sorted array A. That is, the compression engine searches for A[i] in array B, and identify the array position j storing a value equal to A[i]. With the array position j meeting this condition identified, at block 206 the compression engine binary codes the value j using s bits and stores the resulting coded value to element i of compressed array C. That is, the compression engine sets C[i]=j, where j is coded using s bits. At block 208, the compression engine removes element B[j] from array B and shifts down all of the subsequent array elements (that is, B[j+1], B[j+2], . . . ), if any. At block 210, the compression engine determines whether the following condition is met for the current values of i and s: $N-i=2^{s-1}$ (or, more generally, whether N−i=a power of 2). If so, then at block 212 the value of s is decremented (that is, s=s−1). In either event, the index i is incremented (that is, i=i+1) at block 214, and at block 216 the updated value of index i is compared with N. If fewer than N iterations of the process of blocks 204-216 have occurred (that is, i !=N), then the flow of process 128 returns to block 204 for the next iteration using the updated index value i. Otherwise, if N iterations of the process of blocks 204-216 have occurred (that is, i=N), then the process 128 has completed (block 218) and the resulting compressed array C is available for use.

The process 128 as represented in FIG. 2 may also be represented algorithmically as follows:
  set $s = \lceil \log_2(N) \rceil$;
  set B[x]=x for x=0 to N−1;
  for i=0 to N−1:
    search B to identify j such that B[j]=A[i];
    remove B[j] from B and shift down B[x] for all x>j;
    code value j with s bits at C[i]; and
    if N−i is a power of 2, then set s=s−1.

Thus, to summarize, the processes of blocks 204, 206, and 208 together operate to record the position j of the element A[i] in an array B and storing the value of j in the compressed array C using s bits, and then the element B[j] is removed from array B, thereby reducing the number of possible remaining choices in the resulting modified array B. Accordingly, this process of blocks 204, 206, and 208 may repeat one or more times until it is determined at block the number of elements remaining in the modified array B requires fewer bits as there are fewer remaining choices left in the modified array B, at which point the variable s is decremented, and thus results in the next one or more codings of the corresponding values of j using one less bit. This process continues until all elements N from sorted array A have been coded using progressively fewer bits. As such, the compressed array C may be mathematically represented as:

$$C = [x_0, x_1, x_2, \ldots, x_{N-1}], \text{ where } x_n \in \{0, 1, 2, \ldots, N-1\} \text{ and}$$

$$x_i \ne x_j \text{ for any distinct } i \text{ and } j$$

For a typical 43-patch FREAK spatial feature descriptor, Table 1 below illustrates the bit coding decimation progression resulting from the process 128:

| Array Elements | Number | Coding Bits (s) |
|---|---|---|
| $X_0 \ldots X_{10}$ | 11 | 6 |
| $X_{11} \ldots X_{26}$ | 16 | 5 |
| $X_{27} \ldots X_{34}$ | 8 | 4 |
| $X_{35} \ldots X_{38}$ | 4 | 3 |
| $X_{39}$ and $X_{40}$ | 2 | 2 |
| $X_{41}$ | 1 | 1 |
| $X_{42}$ | 0 | 0 (not coded at all) |

Thus, as Table 1 illustrates, for a 43-patch implementation resulting in a 512-bit FREAK spatial feature descriptor 112 that requires 64 bytes to store, the resulting compressed array 130 may require only 195 bits (or 25 bytes if no bit-packing is assumed), and thus achieve a compression ratio of 2.6, or an overhead of only 19 bits compared to the best-case scenario of 176 bits, all without requiring complex factorial multiplication and division operations.

Figure 3:
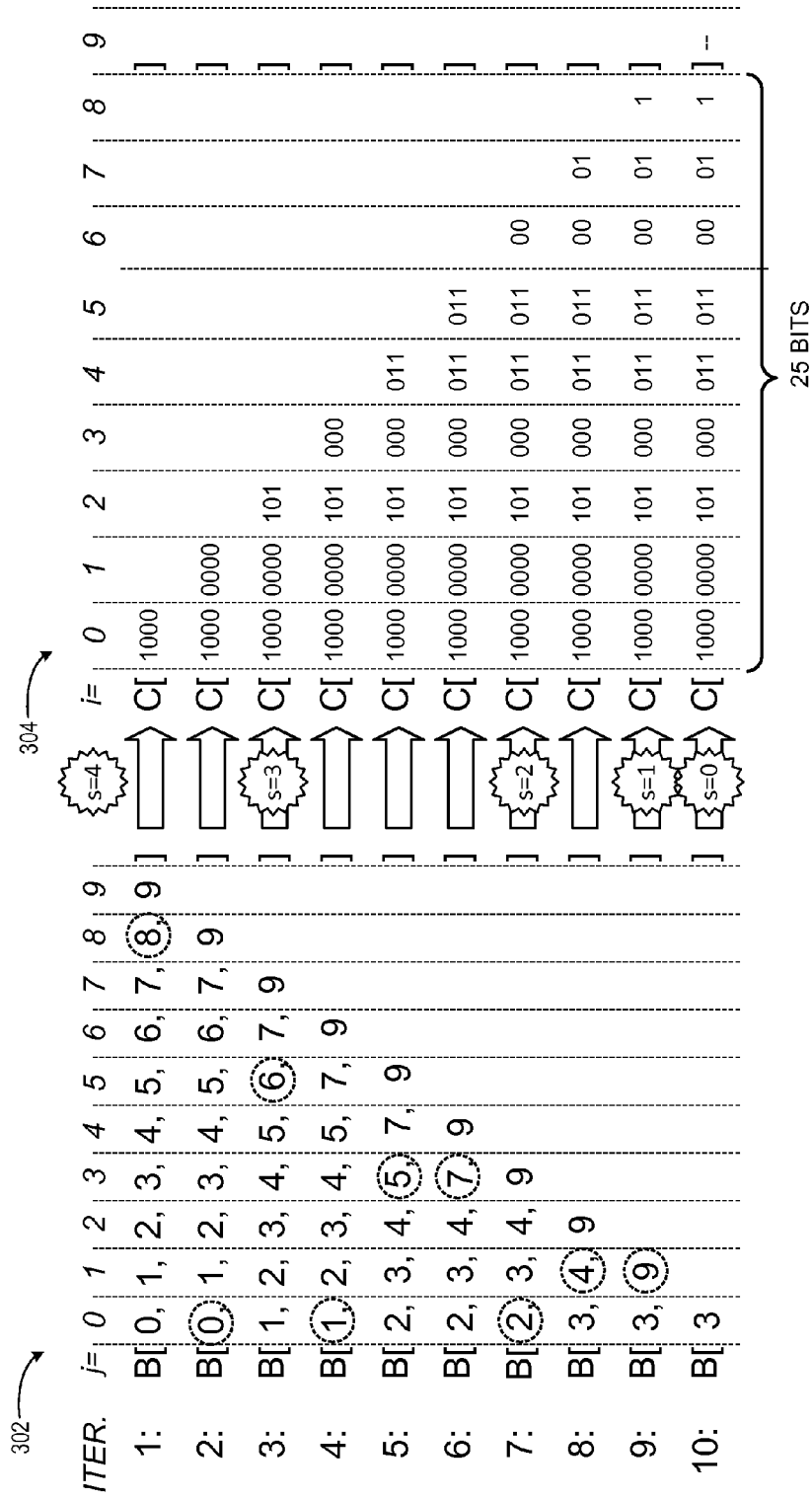
FIG. 3 is a diagram illustrating an example of the progressive bit representation decimation process of FIG. 2 in accordance with some embodiments.

FIG. 3 is a chart 300 depicting an example application of the progressive bit representation decimation process 128 of FIG. 2. For brevity and ease of illustration, the illustrated example is provided in the context of a FREAK spatial feature descriptor that employs 10 patches, rather than the more typical 43 patches. The left portion 302 of chart 300 represents the state of the temporary array B through ten iterations, the right portion 304 of chart 300 represents the corresponding state of a compressed array C through these ten iterations, and the upper portion 306 of chart 600 represents the sorted array A of this example. In this particular example sorted array A is constructed with the following sequence of array elements A[8,0,6,1,5,7,2,4,9,3], and the compressed array C is empty. As there are ten elements (0-9), N−1=9, and thus a temporary array B is initially constructed with the following sequence of array elements B[0, 1, 2, 3, 4, 5, 6, 7, 8, 9]. Further, as the value 9 requires four bits, s initially is set to 4.

At iteration 1, i=0 and thus the compression engine identifies the value A[0]=8 and thus locates the value "8" at location 8 (j=8) of array B (that is, B[8]=8) and thus codes the value "8" at C[0] with four bits (i.e., C[0]=1000$_b$). Array element B[8] ("8") is removed from the array B and the element B[9] is shifted down to position B[8], resulting in the modified array B shown in the second row of the chart (iteration 2). For iteration 2, i is incremented to i=1, and thus the compression engine identifies the value A[1]=0 and thus locates the value "0" at location 0 (j=0) of array B (that is, B[0]=0) and thus codes the value "0" at C[1] with four bits (i.e., C[1]=0000$_b$). Array element B[0] ("0") is removed from the array B and the elements B[1] to B[8] are shifted down to positions B[0] to B[7], respectively, resulting in the modified array B shown in the third row of the chart (iteration 3). At this point, there are only 7 remaining positions in the modified array B, and as the value 7 can be coded using 3 bits, s is decremented one, so that s=3.

For iteration 3, i is incremented to i=2, and thus the compression engine identifies the value A[2]=6. The compression engine therefore locates the value "6" at location 5 (j=5) of array B (that is, B[5]=6) and thus codes the value "5" at C[2] with three bits (i.e., C[2]=101$_b$). Array element B[5] ("6") is removed from the array B and the elements B[6] and B[7] are shifted down to positions B[5] and B[6], respectively, resulting in the modified array B shown in the fourth row of the chart (iteration 4). For iteration 4, i is incremented to i=3, and thus the compression engine identifies the value A[3]=1. The compression engine therefore locates the value "1" at location 0 (j=0) of array B (that is, B[0]=1) and thus codes the value "0" at C[3] with three bits (i.e., C[3]=000$_b$). Array element B[0] ("1") is removed from the array B and the elements B[1] to B[6] are shifted down to positions B[0] to B[5], respectively, resulting in the modified array B shown in the fifth row of the chart (iteration 5). For iteration 5, i is incremented to i=4, and thus the compression engine identifies the value A[4]=5. The compression engine therefore locates the value "5" at location 3 (j=3) of array B (that is, B[3]=5) and thus codes the value "3" at C[4] with three bits (i.e., C[4]=011$_b$). Array element B[3] ("5") is removed from the array B and the elements B[4] and B[5] are shifted down to positions B[3] and B[4], respectively, resulting in the modified array B shown in the sixth row of the chart (iteration 6). For iteration 6, i is incremented to i=5, and thus the compression engine identifies the value A[5]=7. The compression engine therefore locates the value "7" at location 3 (j=3) of array B (that is, B[3]=7) and thus codes the value "3" at C[5] with three bits (i.e., C[5]=011$_b$). Array element B[3] ("7") is removed from the array B and the element B[4] is shifted down to position B[3], resulting in the modified array B shown in the seventh row of the chart (iteration 7). Further, because the modified array B now only has four possible selections (j=0 . . . 3), the variable s is decremented to s=2.

For iteration 7, i is incremented to i=6, and thus the compression engine identifies the value A[6]=2. The compression engine therefore locates the value "2" at location 0 (j=0) of array B (that is, B[0]=2) and thus codes the value "0" at C[6] with two bits (i.e., C[6]=00$_b$). Array element B[0] ("2") is removed from the array B and the elements B[1] to B[3] are shifted down to positions B[0] to B[2], respectively, resulting in the modified array B shown in the eighth row of the chart (iteration 8). For iteration 8, i is incremented to i=7, and thus the compression engine identifies the value A[7]=4. The compression engine therefore locates the value "4" at location 1 (j=1) of array B (that is, B[1]=4) and thus codes the value "1" at C[7] with two bits (i.e., C[7]=01$_b$). Array element B[1] ("4") is removed from the array B and the element B[2] is shifted down to position B[1], resulting in the modified array B shown in the ninth row of the chart (iteration 9). Further, because the modified array B now only has two possible selections (j=0 or 1), the variable s is decremented to s=1.

For iteration 9, i is incremented to i=8, and thus the compression engine identifies the value A[8]=9. The compression engine therefore locates the value "9" at location 1 (j=1) of array B (that is, B[1]=9) and thus codes the value "1" at C[8] with one bit (i.e., C[8]=1$_b$). Array element B[1] ("9") is removed from the array B (with no shifting as B[1] was the last element), resulting in the modified array B shown in the tenth row of the chart (iteration 10). At this point, as the last value A[N-1] in the original sorted array A[0 . . . N-1] will always be the last element picked out of the modified array at the last iteration, the coded value C[N-1] will always be coded as "0$_b$". As such, the compressed array C may instead omit the position indicator for the N-1th element (that is, code C[N-1] with zero bits (i.e., C[9]=0 implicitly)), and thus be represented as C[0 . . . N-2], and thus saving one additional bit. Thus, as a result of the ten iterations (or nine with the last element coded with zero bits) in the process 128, the FREAK spatial feature descriptor may be coded using twenty-six (26) bits total (or twenty-five bits if C[N-1] is coded with zero bits, or implicitly understood to always be equal to zero).

Figure 4:
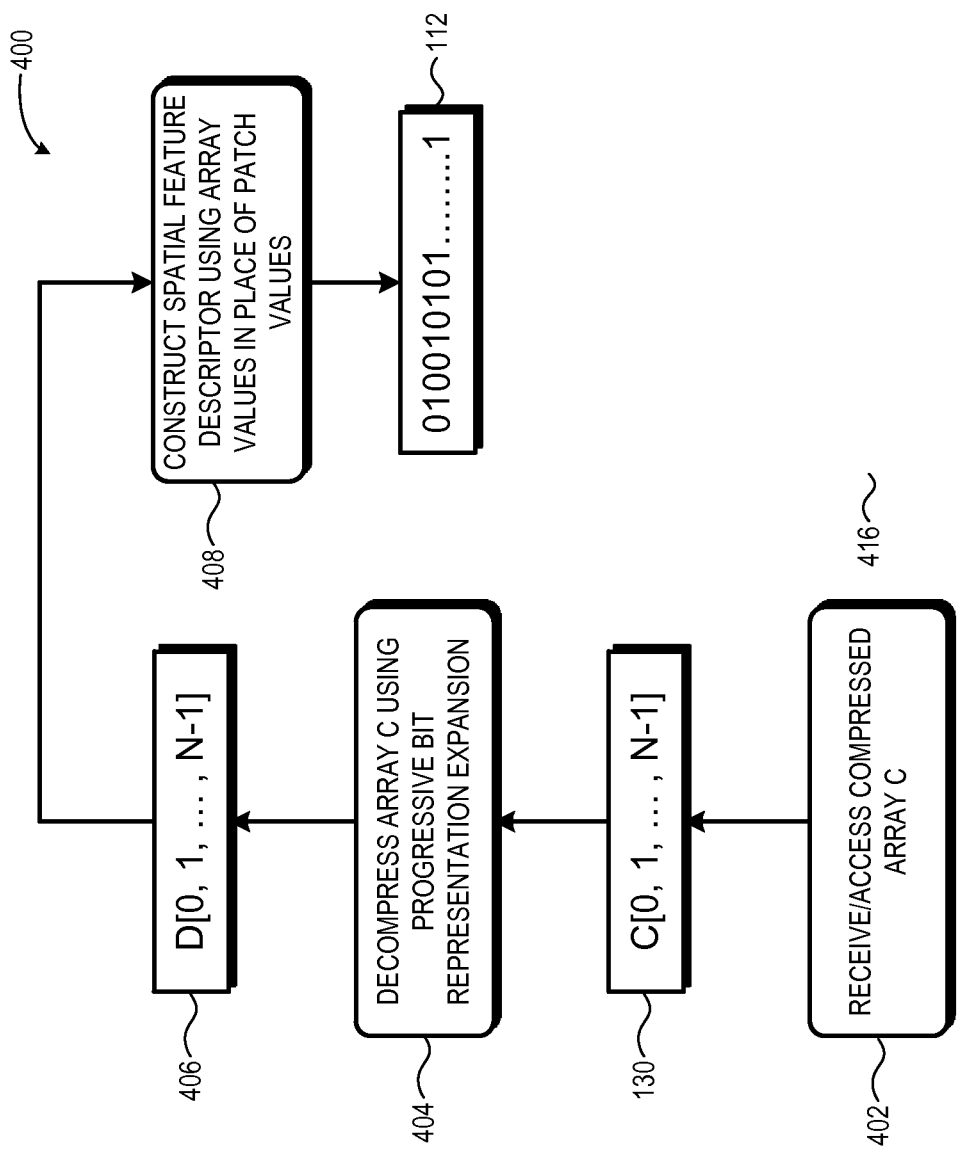
FIG. 4 is a diagram illustrating a lossless spatial feature decompression process in accordance with some embodiments.

FIG. 4 illustrates an example lossless FREAK spatial feature descriptor decompression process 400 in accordance with at least one embodiment of the present disclosure. The FREAK spatial feature descriptor decompression process 400 (hereinafter, "descriptor decompression process 400") is implemented by a decompression engine that, like the compression engine, may be implemented as a set of one or more processors executing a program represented by a set of executable instructions, hard-coded logic, or a combination thereof. An example hardware configuration of an electronic device configured to implement the decompression engine is described in greater detail subsequently with reference to FIG. 7.

As described above, the sorted array A[0 . . . N-1] may be stored, transmitted, or otherwise manipulated as a compressed representation of the FREAK spatial feature descriptor 112, or further compression may be performed and the compressed array C[0 . . . N-1] instead may be stored, transmitted, or otherwise manipulated as the compressed representation of the FREAK spatial feature descriptor 112. In the event that the sorted array A was the compressed representation selected for use, the descriptor decompression process 400 initiates with a FREAK reconstruction process 408, described below. Otherwise, if the compressed array C was the compressed representation selected for use, to initiate the descriptor decompression process 400 the decompression engine accesses the compressed array C from its corresponding storage location or receives the compressed array C over a corresponding communication path, as represented by block 402. The decompression engine then performs a progressive bit representation expansion process 404 to decompresses the compressed array C so as generate a decompressed array D[0 . . . N-1] (also denoted herein as "decompressed array 406"), which is an exact copy, or lossless copy, of the original array A[0 . . . N-1]. The progressive bit representation expansion process 404, in effect, undoes or reverses the array compression performed by the progressive bit representation decimation process 128, and thus is symmetric with the progressive bit representation decimation process 128. An example implementation of the progressive bit representation expansion process 404 is described in greater detail below with reference to FIG. 5.

With the recovered decompressed array D (which represents either the sorted array recovered from the progressive bit representation expansion process 402 as applied to the compressed array C or with the original sorted array A as accessed or received as the final compressed representation of the FREAK spatial feature descriptor 112), during the FREAK reconstruction process 408 the decompression engine reconstructs the FREAK spatial feature descriptor 112 by using each array position of array D as representing a corresponding one of the N patches and the value at each array position standing in for the original patch value. The decompression engine then may recreate the FREAK spatial feature descriptor 112 using these values from the decompressed array D and the predetermined patch pairings specified by the FREAK algorithm 102 (FIG. 1). As the reconstructed FREAK spatial feature descriptor 112 at this point is in its original format, the FREAK spatial feature descriptor 112 may be utilized in any manner in which FREAK spatial feature descriptors may be utilized, such as for object detection, visual odometry, and the like.

Figure 5:
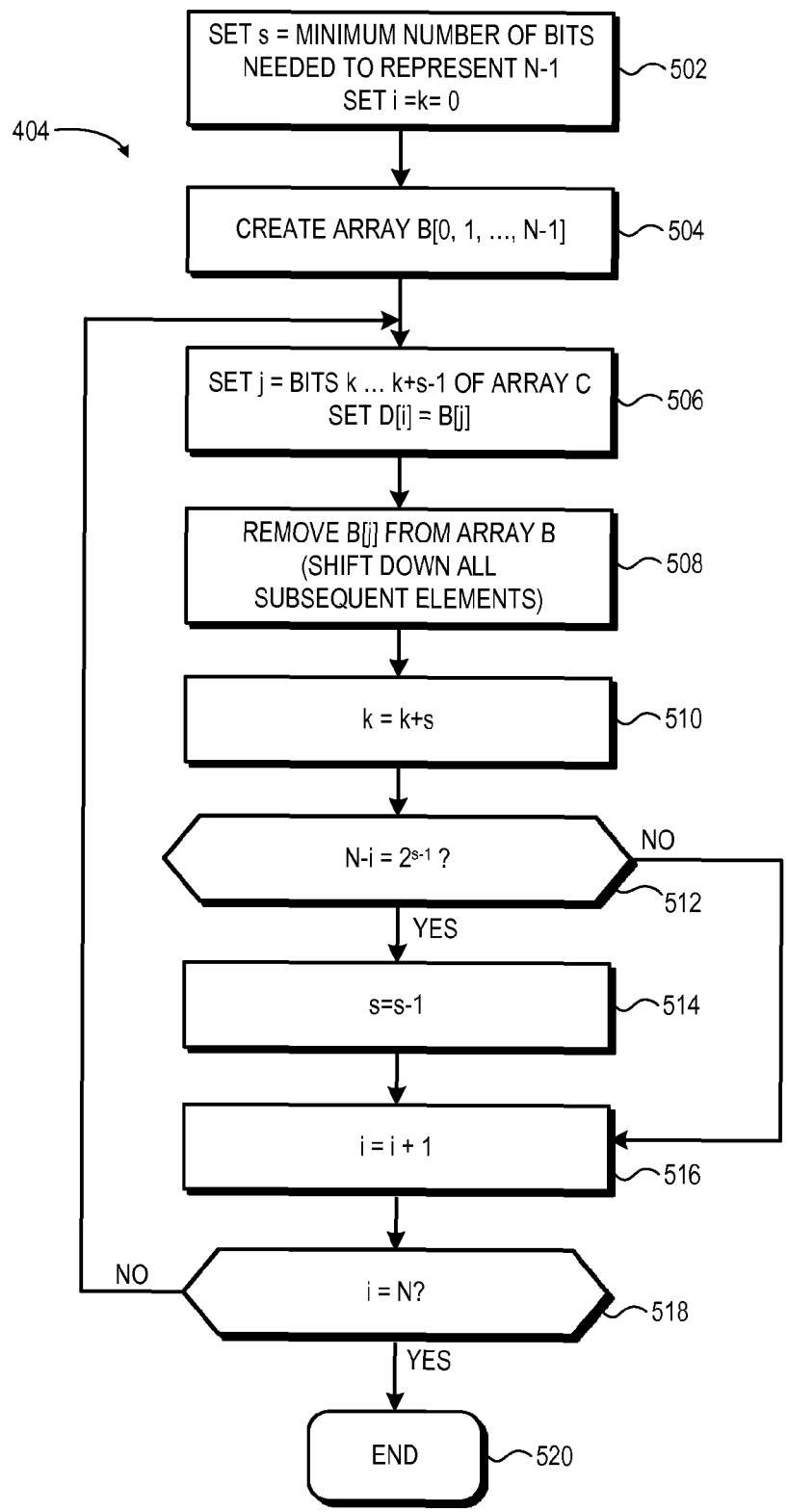
FIG. 5 is a flow diagram illustrating a progressive bit representation expansion process employed in the lossless spatial feature decompression process of FIG. 4 in accordance with some embodiments.

FIG. 5 illustrates an example implementation of the progressive bit representation expansion process 404 used to generate the decompressed array $D[x_0 \ldots x_{N-1}]$ from the compressed array $C[x_0 \ldots x_{N-1}]$. The process 404 initializes at block 502, whereby the decompression engine initially sets the variable s to the minimum number of bits needed to binary code the value N (which represents the number of patches represented in the set 108), that is, initially set $s=\lceil \log_2 (N) \rceil$. Likewise, the index variable i is initialized to zero, that is, initially set i=0. The variable k likewise is initialized to zero, that is, initially set k=0. Further, at block 504 the decompression engine generates a temporary array B having N elements, which are populated with incrementing values from 0 to N−1, that is for x=0 to N−1, B[x]=x, or B=[0, 1, 2, . . . , N−1].

So initialized, the process 404 proceeds to a first, or next, iteration of block 506, whereupon the decompression engine pulls the first element (or the next element if the second or subsequent iteration) from the compressed array C and sets this value to j. For this process, the decompression engine may utilize the variables k and s, and set j=bits k to k+s−1 of array C. Thus, assuming N=43 and thus s initially is set to 6, then for the first iteration m is set to the value of bits 0 to 5 of array C. The decompression engine then sets the element value at D[i] to the element value stored at B[j] (that is, sets D[i]=B[j]). At block 508, the decompression engine removes element B[j] from array B and shifts all subsequent elements (that is, elements B[j+1], B[j+2]) down, such that element B[j+1] is moved to position B[j], element B[j+2] is moved to position B[j+1], etc. At block 510, the decompression engine increases the variable k up by s, that is, sets k=k+s. At block 512, the decompression engine determines whether the following condition is met for the current values of i and s: $N-i=2^{s-1}$. If so, then at block 514 the value of s is decremented (that is, s=s−1). In either event, the index i is incremented (that is, i=i+1) at block 516, and at block 518 the updated value of index i is compared with N. If fewer than N iterations of the process of blocks 506-518 have occurred (that is, i<N), then the flow of process 404 returns to block 506 for the next iteration using the updated index value i and updated variable k. Otherwise, if N iterations of the process of blocks 506-518 have occurred (that is, i=N), then the process 404 has completed (block 520) and the resulting decompressed array D is ready for subsequent processing as described above with reference to the DAG construction process 408.

The process 404 as represented in FIG. 5 may also be represented algorithmically as follows:
set $s=\lceil \log_2(N) \rceil$;
set k=0;
set B[x]=x for x=0 to N−1;
for i=0 to N−1:
    set j=bits k . . . k+s−1 of array C;
    set D[i]=B[j];
    remove B[j] and shift down B[x] for all x>j;
    set k=k+s; and
    if N−i is a power of 2, then s=s−1.

Figure 6:
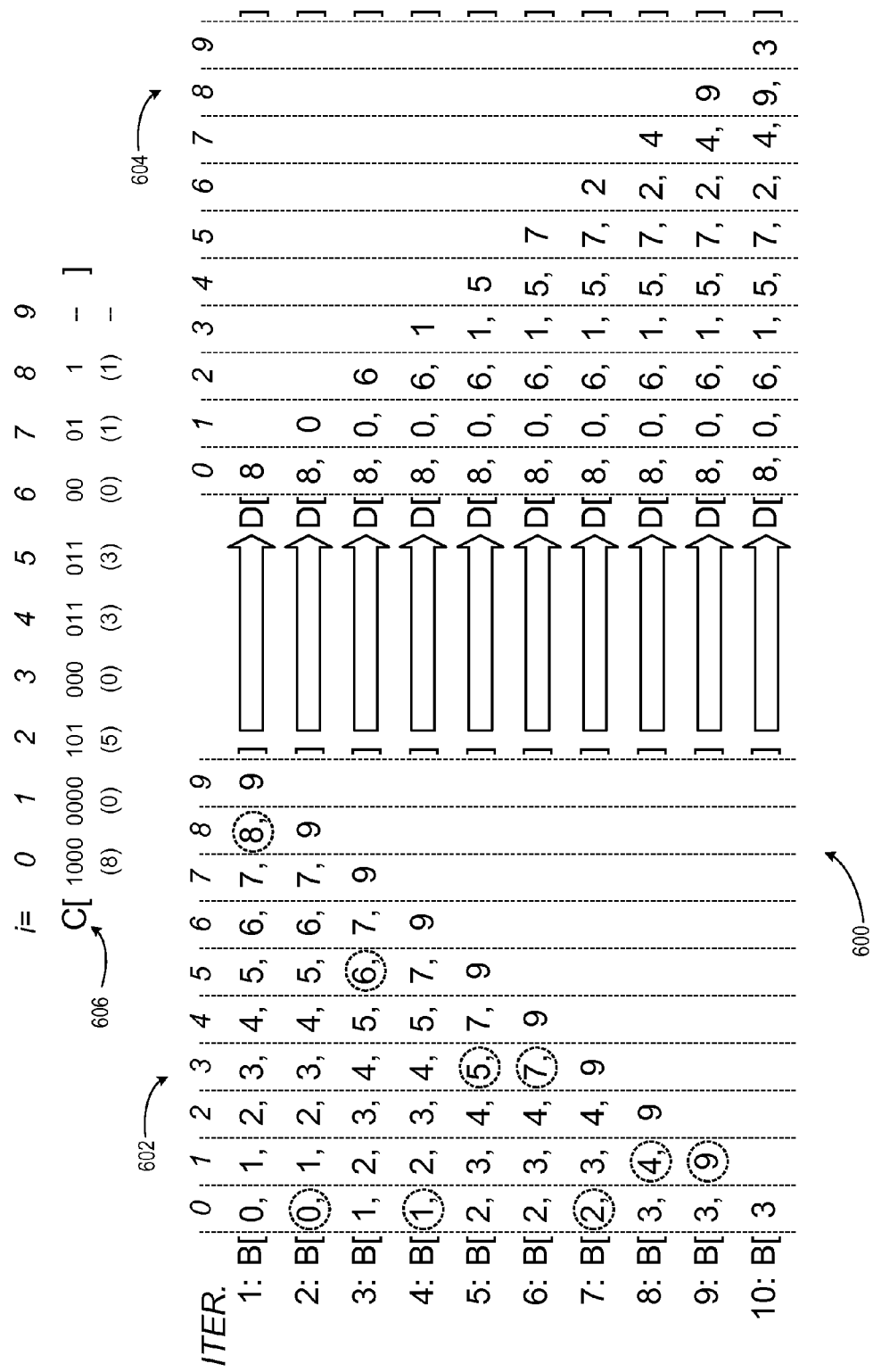
FIG. 6 is a diagram illustrating an example of the progressive bit representation expansion process of FIG. 5 in accordance with some embodiments.

FIG. 6 is a chart 600 depicting an example application of the progressive bit representation expansion process 404 of FIG. 5. For brevity and ease of illustration, the illustrated example is provided in the context of the FREAK spatial feature descriptor that employs 10 patches described above with reference to the example of FIG. 3. The left portion 602 of chart 600 represents the state of the constructed array B through ten iterations, the right portion 604 of chart 600 represents the corresponding state of the decompressed array D through these ten iterations, and the upper portion 606 of chart 600 represents the compressed array C having its elements represented in binary form. Initially, array B is constructed as B[0, 1, 2, 3, 4, 5, 6, 7, 8, 9]. As there are ten elements (0-9) and as the value 9 requires four bits, s initially is set to 4.

At iteration 1, i=k=0 and thus the decompression engine pulls bits 0 to 3 from compressed array C. As bits 0 . . . 3 of array $C=1000_b=8$, j is set to 8. As B[j]=B[8]=8, the decompression engine sets D[0]=B[8]=8. Array element B[8]("8") is removed from the array B and the element B[9] is shifted down to positions B[8], resulting in the modified array B shown in the second row of the chart (iteration 2). For iteration 2, i is incremented to i=1 and k is increased to 4 (=0+4), and the decompression engine thus pulls bits 4 to 7 from compressed array C. As bits 4 . . . 7 of array $C=0000_b=0$, j is set to 0. As B[j]=B[0]=0, the decompression engine sets D[1]=B[0]=0. Array element B[0]("0") is removed from the array B and the elements B[1] to B[8] are shifted down to positions B[0] to B[7], respectively, resulting in the modified array B shown in the third row of the chart (iteration 3). At this point, N−i=10−2=8=an integer power of 2, and thus s is decremented to s=3.

For iteration 3, i is incremented to i=2, k has been increased to 8 (=4+4), and s decremented to 3, and the decompression engine thus pulls bits 8 to 10 from compressed array C. As bits 8 . . . 10 of array $C=101_b$, j is set to 5. As B[j]=B[5]=6, the decompression engine sets D[2]=B[5]=6. Array element B[5]("6") is removed from the array B and the elements B[6] and B[7] are shifted down to positions B[5] and B[6], respectively, resulting in the modified array B shown in the fourth row of the chart (iteration 4). For iteration 4, i is incremented to i=3 and k has been increased to 11 (=8+3), and the decompression engine thus pulls bits 11 to 13 from compressed array C. As bits 11 . . . 13 of array $C=000_b$, j is set to 0. As B[j]=B[0]=6, the decompression engine sets D[3]=B[5]=6. Array element B[5]("6") is removed from the array B and the elements B[6] and B[7] are shifted down to positions B[5] and B[6], respectively, resulting in the modified array B shown in the fifth row of the chart (iteration 5). For iteration 5, i is incremented to i=4 and k has been increased to 14 (=11+3), and the decompression engine thus pulls bits 14 to 16 from compressed array C. As bits 14 . . . 16 of array $C=011_b$, j is set to 3. As B[j]=B[3]=5, the decompression engine sets D[4]=B[3]=5. Array element B[3]("5") is removed from the array B and the elements B[4] and B[5] are shifted down to positions B[3] and B[4], respectively, resulting in the modified array B shown in the sixth row of the chart (iteration 6). For iteration 6, i is incremented to i=5 and k has been increased to 17 (=11+3), and the decompression engine thus pulls bits 17 to 19 from compressed array C. As bits 17 . . . 19 of array C=011$_b$, j is set to 3. As bits 17 . . . 19 of array C=011$_b$, j is set to 3. As B[j]=B[3]=7, the decompression engine sets D[5]=B[3]=7. Array element B[3]("7") is removed from the array B and the element B[4] is shifted down to position B[3], resulting in the modified array B shown in the seventh row of the chart (iteration 7). Further, at this point, N−i=10−6=4=an integer power of 2, and thus s is decremented to s=2.

For iteration 7, i is incremented to i=6 and k has been increased to 20 (=17+3), and with s=2 the decompression engine thus pulls bits 20 and 21 from compressed array C. As bits 20, 21 of array C=00$_b$, j is set to 0. As B[j]=B[0]=2, the decompression engine sets D[6]=B[0]=2. Array element B[0]("2") is removed from the array B and the elements B[1] to B[3] are shifted down to positions B[0] to B[2], respectively, resulting in the modified array B shown in the eighth row of the chart (iteration 8). For iteration 8, i is incremented to i=7 and k has been increased to 22 (=20+2), and the decompression engine thus pulls bits 22 and 23 from compressed array C. As bits 22, 23 of array C=01$_b$, j is set to 1. As B[j]=B[1]=4, the decompression engine sets D[7]=B[1] =4. Array element B[1]("4") is removed from the array B and element B[2] is shifted down to position B[1], resulting in the modified array B shown in the ninth row of the chart (iteration 9). Further, at this point s is decremented again so that s=1.

For iteration 9, i is incremented to i=8 and k has been increased to 24 (=22+2), and with s=1 the decompression engine thus pulls bit 24 from compressed array C. As bit 24 of array C=1$_b$, j is set to 1. As B[j]=B[1]=9, the decompression engine sets D[8]=B[1]=9. Array element B[1]("9") is removed from the array B, resulting in the modified array B shown in the tenth row of the chart (iteration 10). For iteration 10, B[0]=3 is the only array element remaining in array B. Further, as noted above, the last element of compressed array C, that is, C[N−1] may be coded with zero bits, or otherwise omitted, with the implicit understanding that C[N−1] is always equal to zero based on the algorithm described above, and thus D[9] is set to 3, that is D[0]=B [0]=3. At this point, construction of the decompressed array D is complete and thus the decompressed array D may be further processed for reconstruction of the original FREAK spatial feature descriptor 112 as described above with reference to FIG. 4.

Figure 7:
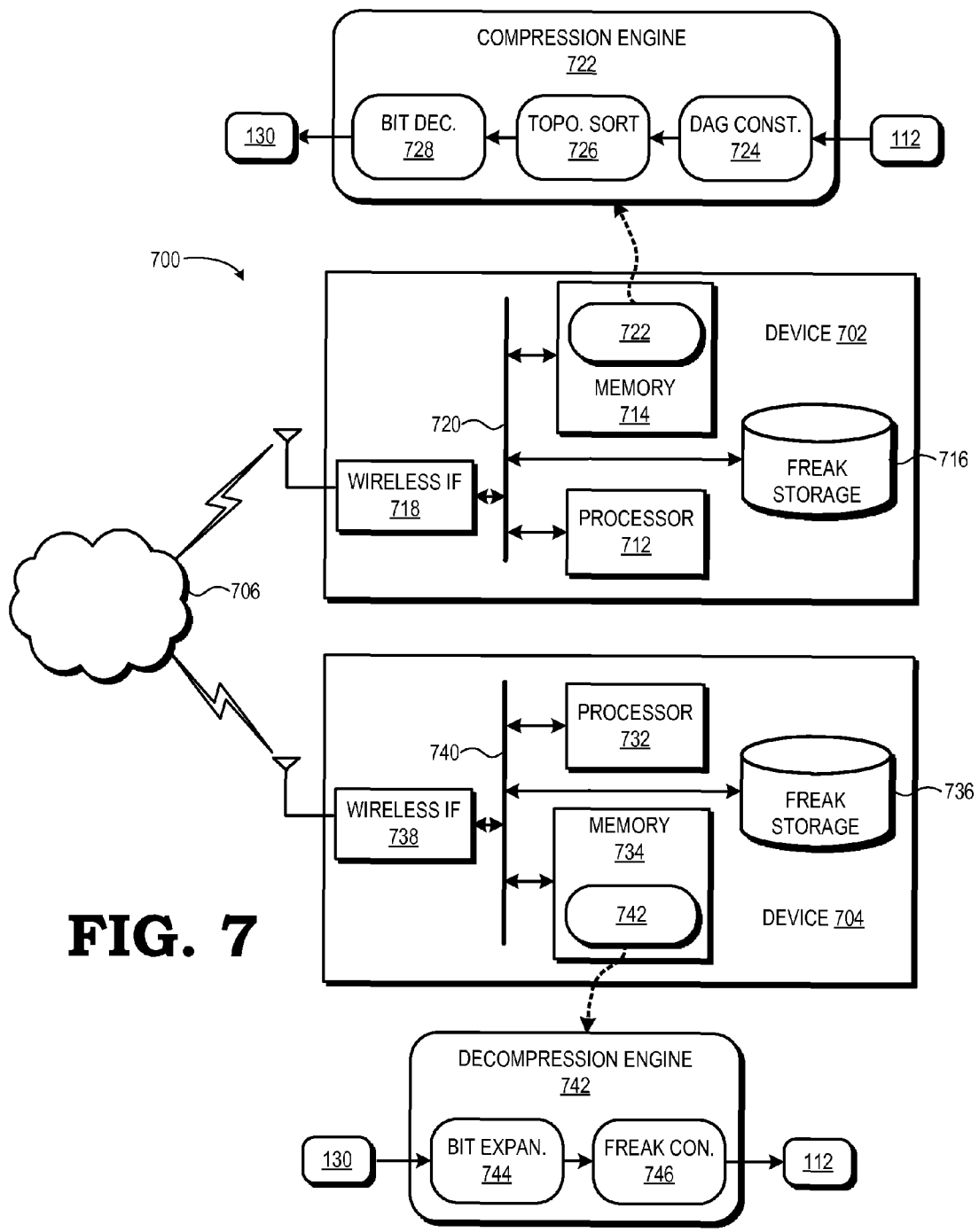
FIG. 7 is a diagram illustrating an example electronic system employing lossless spatial feature compression and decompression in accordance with some embodiments.

FIG. 7 illustrates an example system 700 that may be used to implement the techniques described above. In the depicted embodiment, the system 700 includes two separate electronic devices 702 and 704 connected via a network 706 (e.g., a local area network (LAN) or the Internet). The electronic device 702 operates to compress FREAK spatial feature descriptors 112 into corresponding compressed representations in the form of the compressed array 130 (that is, compressed array C), which then may be transmitted to the electronic device 702 for lossless decompression back into the corresponding FREAK spatial feature descriptor 112. However, in other embodiments, the compression of the FREAK spatial feature descriptors 112 may be performed for purposes of reduced local storage, and thus the electronic devices 702 and 704 may be the same electronic device, in that the electronic device 702 compresses each FREAK spatial feature descriptor 112 into a corresponding compressed representation in the form of the compressed array 130, which is then locally stored at the electronic device. Subsequently, when access to the FREAK spatial feature descriptor 112 is needed, the electronic device accesses the compressed array 130 from local storage and losslessly decompresses the compressed array C to obtain the original FREAK spatial feature descriptor 112. In either event, each of the electronic devices 702, 704 may comprise any of a variety of computing-enabled electronic devices, such as a desktop computer, a server, a notebook computer, a tablet computer, a smart phone, a smart watch, a personal digital assistant, a gaming console, and the like.

As shown, the electronic device 702 includes one or more processors 712, one or more storage components, such as system memory 714 and a storage drive 716, and a network interface 718 (e.g., a wireless or wired interface) interconnected via one or more busses 720 or other component interconnects. The electronic device 702 further implements a compression engine 722, which in the depicted embodiment is implemented as a program, application, or other software module having a set of executable instructions stored in the system memory 714 or other storage component of the electronic device 702 and having the one or more processors 712 executing the set of executable instructions such that the executable instructions manipulate the one or more processors 712 and associated components of the electronic device 702 to perform the actions described above. In other embodiments, some or all of the functionality of the compression engine 722 may be implemented using an ASIC, a programmable logic device, or other hard-coded logic.

The compression engine 722 includes a DAG construction module 724, a topological sort module 726, and a bit decimation module 728. In operation, when a FREAK spatial feature descriptor 112 (generated by the electronic device 702 or received from another device) is selected from the storage drive 716, the system memory 714, or other local storage for compression, the DAG construction module 724 processes the FREAK spatial feature descriptor 112 to construct the DAG 116 as described above with reference to the directed graph process 114 of FIG. 1. The topological sort module 726 then performs the topological sort process 112 as described above. The bit decimation module 728 then performs the progressive bit representation decimation process 128 as described above, resulting in the output of the compressed array 130, which is then either locally stored at the electronic device 702 for subsequent access and decompression, or transmitted to the electronic device 704 via the network 706.

As with the electronic device 702, the electronic device 704 includes one or more processors 732, one or more storage components, such as system memory 734 and a storage drive 736, and a network interface 738 interconnected via one or more busses 740 or other component interconnects. The electronic device 704 further implements a decompression engine 742, which in the depicted embodiment is implemented as a software module having a set of executable instructions stored in the system memory 734 or other storage component of the electronic device 704 and having the one or more processors 732 executing the set of executable instructions such that the executable instructions manipulate the one or more processors 732 and associated components of the electronic device 704 to perform the actions described above. In other embodiments, some or all of the functionality of the decompression engine 742 may be implemented using an ASIC, a programmable logic device, or other hard-coded logic.

The decompression engine 742 includes a bit expansion module 744 and a FREAK construction module 746. In operation, when compressed representation of a FREAK spatial feature descriptor in the form of the compressed array 130 is received from the electronic device 702 or selected for access from local storage, the bit expansion module 744 processes the compressed array 130 to generate the decompressed array 406 (that is, decompressed array D) as described above with reference to the progressive bit representation expansion process 404 of FIG. 5. The FREAK construction module 746 then reconstructs the original FREAK spatial feature descriptor 112 from the decompressed array D and the set of patch pair comparisons specified by the FREAK algorithm 112 as described above, resulting in the output of the original FREAK spatial feature descriptor 112, which is then either locally stored at the electronic device 704 for subsequent access and decompression, or provided for use in any of variety of applications that rely on FREAK spatial feature descriptors.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
   receiving a spatial feature descriptor representing a binary string of comparison results between specified pairings of N patches in a region of an image, N being an integer greater than one; and
   compressing the spatial feature descriptor by:
      determining a minimum number of bits needed to represent N−1; and
      generating a sorted array representing a ranking of the N patches based on the binary string of comparison results, each element of the sorted array associated with a corresponding patch of the N patches and storing a value representing a ranking of the patch relative to other patches of the N patches, wherein the value is coded and has a number of bits based on a position of the corresponding element in the sorted array, and wherein the number of bits in the value is less than or equal to the minimum number of bits needed to represent N−1.

2. The method of claim 1, wherein generating the sorted array comprises:
   constructing a directed acyclic graph based on the binary string of comparison results and the specified pairings; and
   topologically sorting the directed acyclic graph to generate the sorted array.

3. The method of claim 1, further comprising:
   generating a compressed array from the sorted array based on an algorithm:
      let A represent the sorted array, B represent a temporary array of N elements, and C represent the compressed array;
      set s initially to the minimum number of bits needed to represent N−1;
      set B [x]=x for x=0 to N−1; and
      for i=0 to N−1:
         search B to identify j such that B[j]=A[i];
         remove B[j] from B and shift down B[x] for all x>j;
         code value j with s bits at C[i]; and
         if N−i is a power of 2, then set s=s−1.

4. The method of claim 3, further comprising at least one of:
   storing the compressed array as a compressed representation of the spatial feature descriptor; and
   transmitting the compressed array to a remote device as a compressed representation of the spatial feature descriptor.

5. The method of claim 1, further comprising at least one of:
   storing the sorted array as a compressed representation of the spatial feature descriptor; and
   transmitting the sorted array to a remote device as a compressed representation of the spatial feature descriptor.

6. The method of claim 1, wherein the spatial feature descriptor comprises a Fast Retina Keypoint (FREAK) spatial feature descriptor.

7. An electronic device comprising:
   an interface to receive a spatial feature descriptor representing a binary string of comparison results between specified pairings of N patches in a region of an image, N being an integer greater than one; and
   a compression engine to compress the spatial feature descriptor by:
      determining a minimum number of bits needed to represent N−1; and
      generating a sorted array representing a ranking of the N patches based on the binary string of comparison results, each element of the sorted array associated with a corresponding patch of the N patches and storing a value representing a ranking of the patch relative to other patches of the N patches, wherein the value is coded and has a number of bits based on a position of the corresponding element in the sorted array, and wherein the number of bits in the value is less than or equal to the minimum number of bits needed to represent N−1.

8. The electronic device of claim 7, wherein the compression engine is to compress the sorted array by:
   constructing a directed acyclic graph based on the binary string of comparison results and the specified pairings; and
   topologically sorting the directed acyclic graph to generate the sorted array.

9. The electronic device of claim 7, wherein the compression engine further is to:
   generate a compressed array from the sorted array using an algorithm:
      let A represent the sorted array, B represent a temporary array of N elements, and C represent the compressed array;
      set s initially to the minimum number of bits needed to represent N−1;
      set B [x]=x for x=0 to N−1; and
      for i=0 to N−1:
         search B to identify j such that B [j]=A[i];
         remove B[j] from B and shift down B [x] for all x>j;
         code value j with s bits at C[i]; and
         if N−i is a power of 2, then set s=s−1.

10. The electronic device of claim 9, wherein the compression engine further is to:
    provide the compressed array for at least one of storage or transmission as a compressed representation of the spatial feature descriptor.

11. The electronic device of claim 7, wherein the compression engine further is to:
    provide the sorted array for at least one of storage or transmission as a compressed representation of the spatial feature descriptor.

12. The electronic device of claim 7, wherein the spatial feature descriptor comprises a Fast Retina Keypoint (FREAK) spatial feature descriptor.

13. A computer-implemented method comprising:
    receiving a compressed representation of a spatial feature descriptor that represents a binary string of comparison results between specified pairings of N patches in a region of an image, N being an integer greater than one, wherein the compressed representation comprises a compressed array of elements being coded with varying number of bits; and
    decompressing the compressed representation to losslessly reconstruct the spatial feature descriptor by:
       constructing a sorted array representing a ranking of the N patches based on the compressed array, each element of the sorted array associated with a corresponding patch of the N patches and storing a value representing a ranking of the patch relative to other patches of the N patches.

14. The method of claim 13, wherein decompressing the compressed representation further comprises:
    constructing the spatial feature descriptor by treating each value of the sorted array as a patch value for a corresponding patch associated with an array position of the value.

15. The method of claim 13, wherein:
    constructing the sorted array comprises constructing the sorted array based on an algorithm:
       let D represent the sorted array and C represents the compressed array;
       set s initially to the minimum number of bits needed to represent N−1;
       set k initially to zero;
       construct a temporary array B such that initially B[x]=x for all x in 0 to N−1; and
       for i=0 to N−1:
          set j=bits k . . . k+s−1 of array C;
          set D[i]=B[j];
          remove B [j] and shift down B[x] for all x>j;
          set k=k+s; and
          if N−i is a power of 2, then s=s−1.

16. The method of claim 13, wherein the spatial feature descriptor comprises a Fast Retina Keypoint (FREAK) spatial feature descriptor.

17. An electronic device comprising:
    an interface to receive a compressed representation of a spatial feature descriptor that represents a binary string of comparison results between specified pairings of N patches in a region of an image, N being an integer greater than one, wherein the compressed representation comprises a compressed array of elements being coded with varying number of bits; and
    a decompression engine to losslessly reconstruct the spatial feature descriptor from the compressed array by:
       constructing a sorted array representing a ranking of the N patches based on the compressed array, each element of the sorted array associated with a corresponding patch of the N patches and storing a value representing a ranking of the patch relative to other patches of the N patches.

18. The electronic device of claim 17, wherein the decompression engine further is to losslessly reconstruct the spatial feature descriptor by:
    constructing the spatial feature descriptor by treating each value of the sorted array as a patch value for a corresponding patch associated with an array position of the value.

19. The electronic device of claim 17, wherein:
    the decompression engine is to construct the sorted array based on an algorithm:

let D represent the sorted array and C represents the compressed array;
set s initially to the minimum number of bits needed to represent N−1;
set k initially to zero;
construct a temporary array B such that initially B[x]=x for all x in 0 to N−1; and
for i=0 to N−1:
  set j=bits k . . . k+s−1 of array C;
  set D[i]=B[j];
  remove B[j] and shift down B[x] for all x>j;
  set k=k+s; and
  if N−i is a power of 2, then s=s−1.

20. The electronic device of claim 17, wherein the spatial feature descriptor comprises a Fast Retina Keypoint (FREAK) spatial feature descriptor.

* * * * *